(12) United States Patent
Iftissen

(10) Patent No.: US 11,480,269 B2
(45) Date of Patent: Oct. 25, 2022

(54) DEVICE FOR SEALING BETWEEN TWO COAXIAL DUCTS AND ASSEMBLY

(71) Applicant: Gérard Iftissen, Saint Martin D'Uriage (FR)

(72) Inventor: Gérard Iftissen, Saint Martin D'Uriage (FR)

( * ) Notice: Subject to any disclaimer, the term of this patent is extended or adjusted under 35 U.S.C. 154(b) by 410 days.

(21) Appl. No.: 16/496,268

(22) PCT Filed: Mar. 16, 2018

(86) PCT No.: PCT/FR2018/050641
§ 371 (c)(1),
(2) Date: Sep. 20, 2019

(87) PCT Pub. No.: WO2018/172673
PCT Pub. Date: Sep. 27, 2018

(65) Prior Publication Data
US 2020/0032930 A1 Jan. 30, 2020

(30) Foreign Application Priority Data
Mar. 21, 2017 (FR) .................................. 1752316

(51) Int. Cl.
*F16M 11/00* (2006.01)
*F16L 7/02* (2006.01)
*F24F 13/02* (2006.01)

(52) U.S. Cl.
CPC ............ *F16L 7/02* (2013.01); *F24F 13/0209* (2013.01)

(58) Field of Classification Search
CPC .............................. F16L 7/02; F24F 13/0209
See application file for complete search history.

(56) References Cited

U.S. PATENT DOCUMENTS 3,471,179 A * 10/1969 Sixt .................... F16L 25/14
285/148.22
3,799,223 A * 3/1974 Feneziani ......... F16L 27/12751
141/388

(Continued)

FOREIGN PATENT DOCUMENTS

| EP | 1227202 A1 | 7/2002 |
| EP | 1422477 A2 | 5/2004 |
| GB | 2 274 888 A | 8/1994 |

OTHER PUBLICATIONS

International Search Report dated Jun. 8, 2018, issued in corresponding International Application No. PCT/FR2018/050641, filed Mar. 16, 2018, 6 pages.

*Primary Examiner* — Amy J. Sterling
(74) *Attorney, Agent, or Firm* — Christensen O'Connor Johnson & Kindness, PLLC

(57) ABSTRACT

A sealing device comprising: an axially deformable tubular membrane (4) having a first annular end and a second annular end (8), a first annular coupling ring (5; 205) rigidly connected to the first end of the tubular membrane and having a lateral annular wing (10) providing an axial annular attachment space (12) that is axially open on the side of the second annular end of the tubular membrane and is radially located on a lateral side of the tubular membrane, and a second coupling ring (7) rigidly connected to the second end of the tubular membrane and having a projecting lateral annular ring (14) axially extending opposite the first annular end of the tubular membrane and radially offset opposite said axial annular attachment space relative to said lateral side of the tubular membrane. An assembly comprising two coaxial ducts (2, 3) engaged together, between which the sealing device is mounted.

15 Claims, 4 Drawing Sheets

(56) References Cited

U.S. PATENT DOCUMENTS

| | | | | |
|---|---|---|---|---|
| 3,834,577 | A * | 9/1974 | Tempero | B65D 39/04 |
| | | | | 312/401 |
| 5,020,810 | A | 6/1991 | Jobe | |
| 5,415,436 | A * | 5/1995 | Claes | F16L 25/0045 |
| | | | | 285/110 |
| 5,782,498 | A * | 7/1998 | Vick | F16L 7/02 |
| | | | | 285/123.1 |
| 6,877,781 | B2 * | 4/2005 | Edler | F16L 25/0036 |
| | | | | 285/322 |
| 7,100,950 | B2 * | 9/2006 | Martin | F16L 25/0045 |
| | | | | 285/319 |
| 8,056,938 | B2 * | 11/2011 | Shen | H02G 3/06 |
| | | | | 285/321 |
| 8,689,504 | B2 * | 4/2014 | Monden | F16L 5/04 |
| | | | | 52/220.8 |
| 9,601,914 | B2 * | 3/2017 | Chiu | H01B 7/04 |
| 9,784,387 | B2 * | 10/2017 | Kaye | F16L 33/34 |
| 10,865,919 | B2 * | 12/2020 | Cole | F16L 21/03 |
| 2003/0009961 | A1 * | 1/2003 | Radke | E04G 15/061 |
| | | | | 52/220.1 |
| 2008/0088128 | A1 * | 4/2008 | Staskal | E03C 1/122 |
| | | | | 285/230 |
| 2015/0056903 | A1 | 2/2015 | Nagano et al. | |
| 2016/0053995 | A1 | 2/2016 | Sugatani et al. | |

\* cited by examiner

DEVICE FOR SEALING BETWEEN TWO COAXIAL DUCTS AND ASSEMBLY

The present invention concerns the field of sealing devices for establishing a seal between ducts one of which is engaged in the other.

The present invention concerns in particular the field of vertical ducts passing through walls of buildings such as roofs or flat roofs, in particular ventilation ducts.

A known sealing device between an exterior duct and an interior duct described in the patent EP 2 636 913 comprises an interior ring sliding inside an exterior duct and an annular seal disposed between an end of the interior duct and the interior ring, this seal also coming into contact with the wall of the exterior duct.

A known sealing ring described in the patent EP 0 999 397 comprises an annular retaining part engaged in an interior duct and a lip that is connected to this retaining part, passes in front of the end of the interior duct and is in contact with the interior face of an exterior duct.

A known one-piece sealing sleeve described in the patent GB 2 274 888 comprises a cylindrical portion provided with spaced peripheral lips and at one end of this cylindrical portion a cylindrical extension of greater diameter and at the other end of the cylindrical portion an interior radial annular shoulder. This one-piece sealing sleeve is mounted around an end portion of one duct and is intended to be introduced into an exterior duct so that the peripheral lips are in contact with the interior face of that exterior duct.

In accordance with one embodiment there is proposed a sealing device that comprises an axially deformable tubular membrane having a first annular end and a second annular end, a first annular coupling ring fastened to the first end of the tubular membrane and having a lateral annular flange providing an axial annular attachment space that is axially open on the side of the second annular end of the tubular membrane and is radially situated on a lateral side of the tubular membrane, and a second coupling ring fastened to the second end of the tubular membrane and having a projecting lateral annular flange extending axially away from the first annular end of the tubular membrane and radially offset away from said axial annular attachment space relative to said lateral side of the tubular membrane.

The axial distance between the first coupling annular ring and the second coupling annular ring is therefore adjustable by axial deformation of the tubular membrane.

The first coupling annular flange may comprise an interior annular flange, an exterior annular flange offset radially relative to the interior annular flange and a connecting annular portion connecting the exterior annular flange and the interior annular flange;

the second coupling annular ring may comprise an interior annular flange, an exterior annular flange offset radially outward relative to the interior annular flange and a connecting annular portion connecting the exterior annular flange and the interior annular flange;

the interior flange, respectively the exterior flange, of the first coupling annular ring may be fastened to the first end of the membrane and the other flange constitutes said lateral annular flange of this first coupling annular ring;

the exterior flange, respectively the interior flange, of the second coupling annular ring may be fastened to the second end of the tubular membrane and the other constitutes said lateral annular flange of this second coupling annular ring.

The interior and exterior annular flanges and the connecting annular portion of the first coupling annular ring may form a U shape.

The interior and exterior annular flanges of the second coupling annular ring may extend axially away from each other and the connecting annular portion of this second coupling annular ring is of frustoconical shape.

The first coupling annular ring may comprise a terminal annular flange engaged in a retaining annular slot of the first annular end of the tubular membrane.

Said terminal annular flange of the first coupling annular ring may form a hook opposite the second annular end of the tubular membrane.

The first annular end of the tubular membrane may comprise a bead in which said retaining annular slot is formed.

The second coupling annular ring may comprise a terminal annular flange engaged in a retaining annular slot of the second end.

Said terminal annular flange of the second coupling annular ring may form a hook opposite the first annular end of the tubular membrane.

The second annular end of the tubular membrane may comprise a bead in which said retaining annular slot is formed.

At least a part of the length of the tubular membrane may take the form of a bellows.

The device being adapted to be coupled to coaxial ducts engaged one within the other, said attachment axial annular space of the first coupling annular ring may be radially offset relative to the projecting lateral annular flange of the second coupling ring by at least the distance between the interior face of the interior duct and the exterior face of the exterior duct.

There is also proposed an assembly that comprises two coaxial ducts engaged one in the other and having annular ends axially oriented on the same side and axially distant from each other so that one of the ducts projects relative to the other duct, and that comprises a sealing device, in which the annular end of the projecting duct is engaged in said attachment annular space of said first coupling annular ring and the lateral annular flange of said second coupling annular ring cooperates with the annular end of the other duct.

The assembly may comprise means for fixing said coupling annular rings to said ducts.

The assembly may comprise an annular seal mounted on the first coupling annular ring and against which the end of the projecting duct bears in the axial direction and comprising an annular seal mounted on the second coupling annular ring and against which the end of the other duct bears in the axial direction.

Sealing devices will now be described by way of non-limiting example, illustrated by the drawings, in which.

Figure 1:
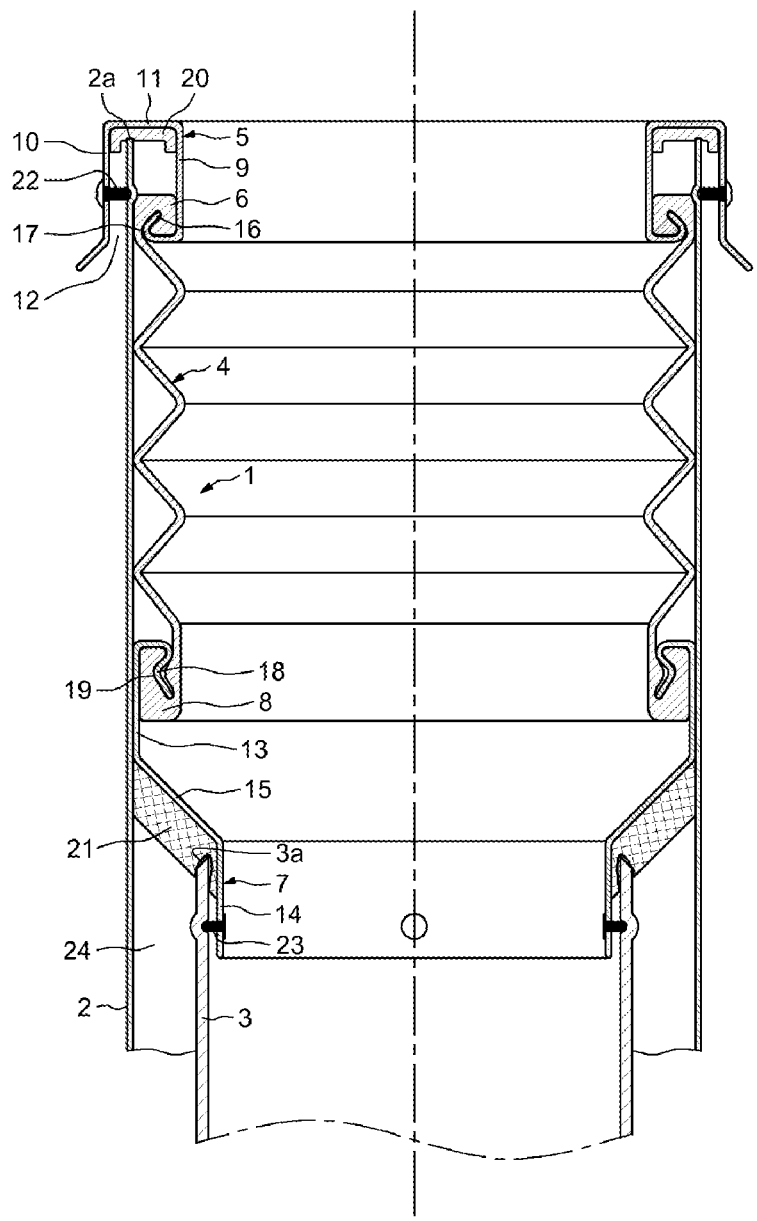
FIG. 1 represents in longitudinal section a sealing device installed between coaxial ducts.

In FIG. 1 there is shown a sealing device 1 intended to establish a sealed connection between two coaxial cylindrical ducts 2 and 3 engaged one in the other so that they have annular ends 2a and 3a oriented axially on the same side and situated at an axial distance from each other, in order to constitute an assembly.

The annular end 2a of the exterior duct 2 is beyond the annular end 3a of the interior duct 3 and consequently the end 3a of the interior duct 3 is situated inside the exterior duct 2 and at a distance from the end 2a of the latter.

The sealing device 1 comprises an axially deformable tubular membrane 4, a first coupling annular ring 5 mounted on a first annular end 6 of the tubular membrane 4 and a second coupling ring 7 mounted on a second annular end 8 of the tubular membrane 4.

The first coupling ring 5 is intended to be coupled to the end 2a of the interior duct 2.

The second coupling ring 7 is intended to be coupled to the end 3a of the exterior duct 2.

The first coupling ring 5 comprises an interior annular flange 9, an exterior lateral annular flange 10 offset radially relative to the interior annular flange 9 and a connecting annular portion 11 connecting the interior annular flange 9 and the exterior annular flange 10.

The interior flange 9 of the first coupling ring 5 is fastened to the first end 6 of the tubular membrane 4 and the exterior flange 10 extends in the direction of the second end 8 of the tubular membrane 4 leaving an adjacent attachment axial annular space 12 open on the side of the second end 8 of the tubular membrane 4.

The attachment axial annular space is radially situated on the exterior lateral side of the tubular membrane 4.

The interior flange 9, the exterior flange 10 and the connecting portion 11 form for example a U-section profiled annular member. The interior flange 9 and the exterior flange 10 are for example cylindrical and the connecting portion 11 is for example radial.

The second coupling ring 7 comprises an exterior annular flange 13, an interior annular flange 14 offset radially inward relative to the exterior annular flange 13 and a connecting annular portion 15 connecting the exterior annular flange 13 and the interior annular flange 14.

The exterior flange 13 of the second coupling ring 7 is fastened to the second end 8 of the tubular membrane 4 and the lateral interior flange 14 projects away from the first end 6 of the tubular membrane 4 and is radially offset inwardly from the attachment axial annular space 12 relative to the exterior lateral side of the tubular membrane 4.

The exterior flange 13, the interior flange 14 and the connecting portion 15 form for example an annular profiled member in which the exterior flange 13 and the interior flange 14 are cylindrical and the connecting portion 15 is frustoconical and converges toward the interior flange 14.

At least a part of the length of the tubular membrane 4 takes the form of an accordion-fold bellows.

The annular ends 6 and 8 of the tubular membrane 4 take the form of beads or pleats.

The interior flange 9 of the first coupling ring 5 is provided, between the interior flange 8 and the exterior flange 10 and at a distance from the latter, with a terminal annular flange 16, in the form of a hook, bent in the direction of the connecting portion 11.

The terminal annular flange 15 is engaged in a blind retaining annular slot 17 formed in the bead forming the end 6 of the tubular membrane 4 so as to be attached and retained and to constitute a sealed connection. This blind annular slot 17 is axially open on the side of the end 8 of the tubular membrane 4.

To mount it, the bead forming the end 6 of the tubular membrane 4 is engaged between the terminal annular flange 16 and the exterior annular flange 10 and then attached to the terminal annular flange 16 of the first coupling ring 5.

The attachment annular space 12 is therefore defined between the exterior face of the bead forming the end 6 of the tubular membrane 4 and the interior face of the exterior flange 10 of the first coupling ring 5 and is radially situated outside the exterior lateral face of the tubular membrane 4.

The exterior flange 13 of the second coupling ring 7 is provided with a terminal annular flange 18, in the form of a hook, bent in the direction of the connecting portion 15 and situated at a distance from and inside the exterior flange 13. The terminal annular flange 18 is engaged in a blind retaining annular slot 19 formed in the bead forming the end 8 of the tubular membrane 4 so as to be attached and retained and to constitute a sealed connection. This blind slot 19 is open axially on the side of the end 6 of the tubular membrane 4.

To mount it, the bead forming the end 8 of the tubular membrane 4 is attached to the terminal annular flange 19 of the second coupling ring 7.

The first coupling ring 5 is provided with a radial annular seal 20 fixed against the interior face of its radial connecting annular portion 11.

The second coupling ring 7 is provided with an annular seal 21 fixed against the face of its inclined connecting annular portion 15 on the side of the interior radial flange 14.

The exterior flange 10 of the first coupling ring 5 is provided with a plurality of radial retaining screws 22 distributed peripherally and maneuverable from the outside.

The interior flange 14 of the second coupling ring 7 is provided with a plurality of radial retaining screws 23 distributed peripherally and maneuverable from the inside.

The sealing device 1 may be placed on the ducts 2 and 3 by hand in the following manner and is sized accordingly. In particular, the radial distance between the attachment annular space 12 and the exterior face of the lateral annular flange 14 is at least equal to the radial distance between the exterior face of the exterior duct 2 and the interior face of the interior duct 3.

The sealing device 1 is axially engaged in the exterior duct 2 by first engaging the second coupling ring 7 in the direction of the end 3a of the interior duct 3. The tubular membrane 4 is then situated on the inside, its exterior lateral side being at a short distance from or in contact with the interior face of the exterior duct 2.

The end 2a of the exterior duct 2 is axially engaged in the attachment annular space 12 of the first coupling ring 5 until this end 2a of the exterior duct 2 comes strongly into contact with the radial annular seal 20 and the screws 22 are tightened from the outside so that they come to bear firmly on the exterior face of the end portion of the exterior duct 2 engaged in the annular space 12. The first coupling ring 5 is therefore coupled in a sealed manner to the exterior duct 2 by virtue of its attachment to the end of the exterior duct 2 situated beyond the end of the interior duct 3.

The engagement of the second coupling ring 7 in the exterior duct 2 is then continued until the lateral interior flange 14 of the second coupling ring 7 is engaged inside the interior duct 3 and the end 3a of the interior duct 3 comes to bear strongly in the axial direction against the annular seal 21. The screws 23 are then tightened from the inside so that they come to bear firmly on the interior face of the end portion of the interior duct 3. The second coupling ring 7 is therefore coupled in a sealed manner to the interior duct 3.

Adaptation of the axial distance between the first coupling ring 5 and the second coupling ring 7 to the axial distance between the ends 2a and 3a of the ducts 2 and 3 is made possible thanks to the existence of the axially deformable tubular membrane 4, which therefore can be lengthened or shortened in the axial direction.

A seal is therefore created between the exterior duct 2 and the interior duct 3, insulating the space 24 between the ducts 2 and 3, which are face to face, relative to the interior of the interior duct 3 and to the exterior.

According to a variant embodiment, the screws 23 could be mounted on the exterior flange 13 of the second coupling ring 7 and come to bear against the interior face of the exterior duct 2.

The tubular membrane 4 may be made of a rubber-like material or a special elastomer such as an ethylene-propylene-diene monomer (EPDM). The coupling rings 5 and 7 may be made of metal, for example aluminum, and may be produced from a disk by spinning or drawing. The annular seals 20 and 21 may be made of a rubber-like material or a plastic material.

Figure 2:
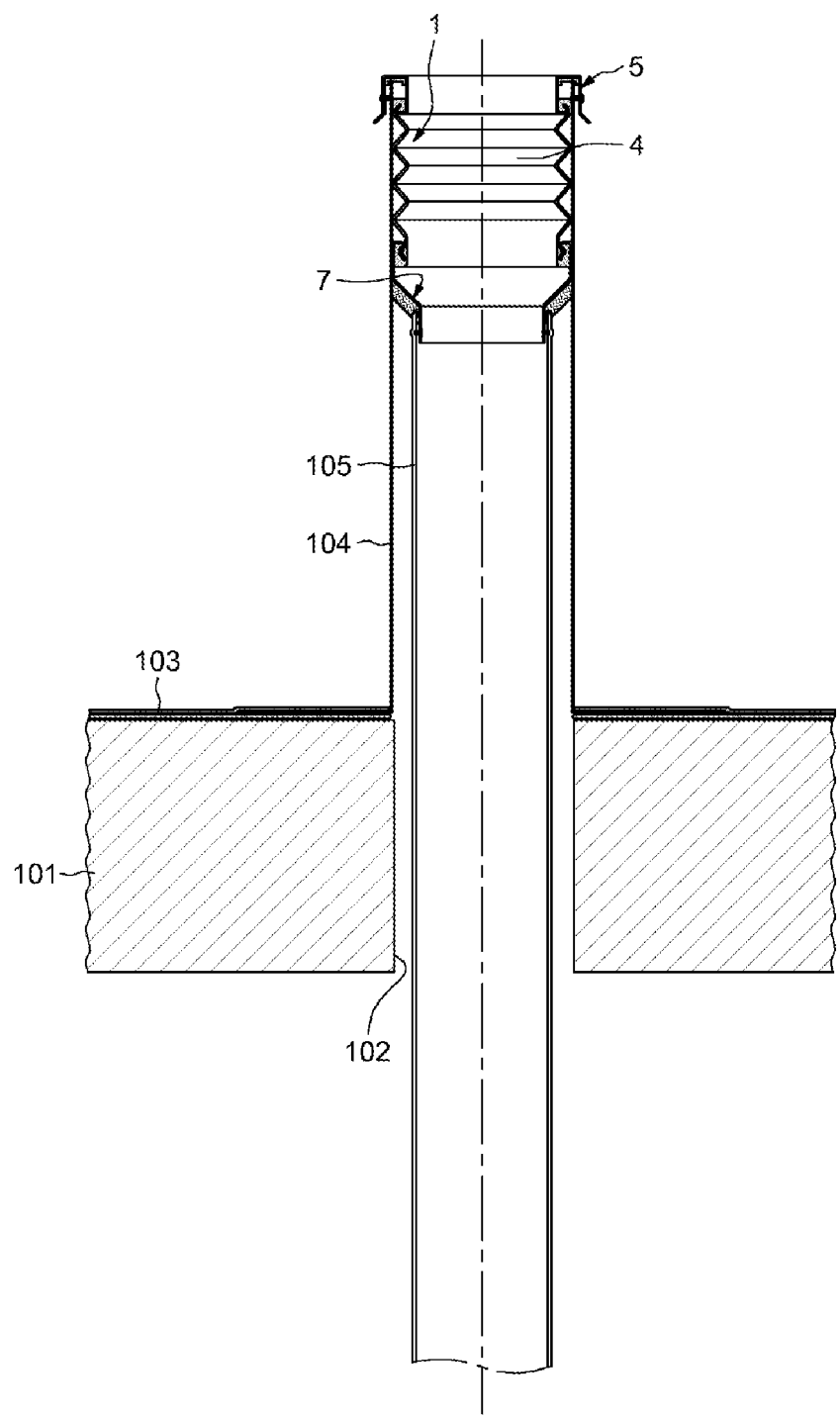
FIG. 2 represents in vertical section one example of application of the sealing device from FIG. 1.

In FIG. 2 is shown one example of application of the sealing device 1.

In this FIG. 2 there is represented a wall 101 of a building, such as a roof or a flat roof, in particular a slab, which has a hole 102 through it and on which is placed an upper seal 103 in the form of one or more layers.

The wall 101 is equipped with an exterior vertical cylindrical duct 104 that extends upwards and the lower end of which is provided with a peripheral radial membrane integrated into the upper seal 103.

A cylindrical interior through-duct 105 is installed vertically through the hole 102 in the wall 101 and extends axially in the exterior duct 104 with a clearance. The through duct 105 extends downward below the wall 101 and upward above the wall 101.

The exterior duct 104 has a length such that it extends upward beyond the upper end of the interior duct 105.

The exterior duct 104 and the interior duct 105 are therefore equivalent to the exterior duct 2 and the interior duct 3 from FIG. 1.

A sealing device 1 such as that described above is installed in an equivalent manner between the upper end of the exterior duct 104 and the upper end of the interior duct 105.

The sealing device 1 therefore creates a seal between the outside and the spaces between the ducts 104 and 15, between the hole 102 in the wall 101 and the interior duct 105 and below the wall 101, around the interior duct 105. Moreover, water is able to trickle against the sealing device 1, toward the exterior of the exterior duct 2 and toward the interior of the interior duct 3, without either retention or infiltration.

Figure 3:
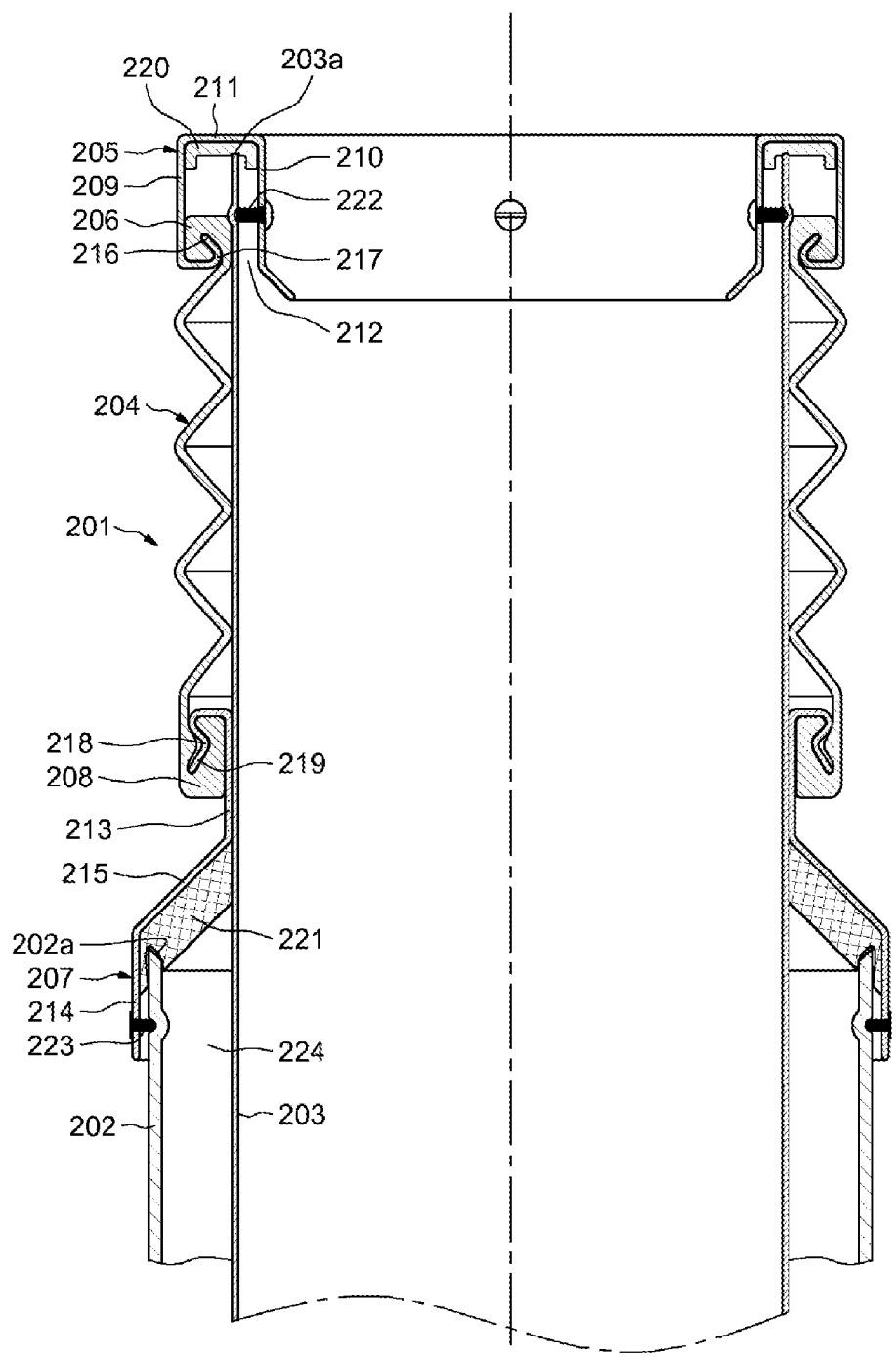
FIG. 3 represents in longitudinal section a variant embodiment of the sealing device from FIG. 1 installed between coaxial ducts.

In accordance with a variant embodiment shown in FIG. 3, with a view to constituting an assembly, a sealing device 201 is intended to establish a sealed connection between two cylindrical coaxial ducts 202 and 203 engaged one in the other so that they have two annular ends 202a and 203a oriented axially on the same side and situated axially at a distance from each other.

This time, the annular end 203a of the interior duct 3 is situated beyond the annular end 202a of the exterior duct 202 and consequently the annular end 202a of the exterior duct 202 is situated around the interior duct 203 and at a distance from the annular end 203a of the latter.

The sealing device 201 has a structure and a disposition that are radially reversed relative to the sealing device 201.

The sealing device 201 comprises a tubular membrane 204 and first and second coupling annular rings 205 and 207 fastened to respective ends of the tubular membrane 204.

The sealing device 201 is engaged around the interior duct 203 and the coupling annular rings 205 and 207 are respectively coupled to the interior duct 203 and to the exterior duct 205. The tubular membrane 204 is then situated outside and at a small distance from or in contact with the interior face of the interior duct 203, its interior lateral side being at a small distance from or in contact with the exterior face of the interior duct 203.

The first coupling annular ring 205 comprises an exterior annular flange 209, an interior annular flange 210 offset radially relative to the interior lateral annular flange 210 and a connecting annular portion 211 connecting the interior annular flange 210 and the exterior annular flange 209, forming a U shape.

The exterior flange 209 is fastened to the end 206 of the tubular membrane 204 and is provided with a bent terminal annular flange 216 engaged in a blind annular slot 217 of a bead at the end 206 of the tubular membrane 204.

There is formed between the interior flange 210 and the end bead 206 of the tubular membrane 204 an attachment annular space 212 that is situated on the interior lateral side of the tubular membrane 204 and into which the end 203a of the interior duct 203 is introduced.

The end 203a of the interior duct 203 bears axially against an annular seal 220 adjoining the interior face of the connecting portion 211.

Radial retaining screws 222 mounted on the interior flange 210 bear radially against the interior face of the interior duct 203.

The second coupling ring 207 comprises an interior annular flange 213, a lateral exterior annular flange 214 offset radially outward relative to the interior annular flange 213 and a frustoconical connecting annular portion 215 connecting the interior annular flange 213 and the exterior annular flange 214.

The interior flange 213 is fastened to the end 208 of the tubular membrane 204 and is provided with a terminal annular flange 218 that is situated at a distance from and around the interior flange 213 and engaged in a retaining annular slot 219 of a bead at the end 208 of the tubular membrane 204.

The lateral interior flange 214 projects away from the first end 206 of the tubular membrane 204 and is offset radially outward of the attachment axial annular space 212 relative to the interior lateral side of the tubular membrane 204.

The radial distance between the attachment annular space 212 and the interior face of the lateral annular flange 214 is at least equal to the radial distance between the exterior face of the exterior duct 202 and the interior face of the interior duct 203.

The lateral exterior flange 214 is engaged outside the exterior duct 202.

The end 202a of the exterior duct 202 bears axially against an annular seal 221 adjoining the connecting portion 215.

Radial retaining screws 223 mounted on the exterior flange 214 bear radially against the exterior face of the exterior duct 202.

Figure 4:
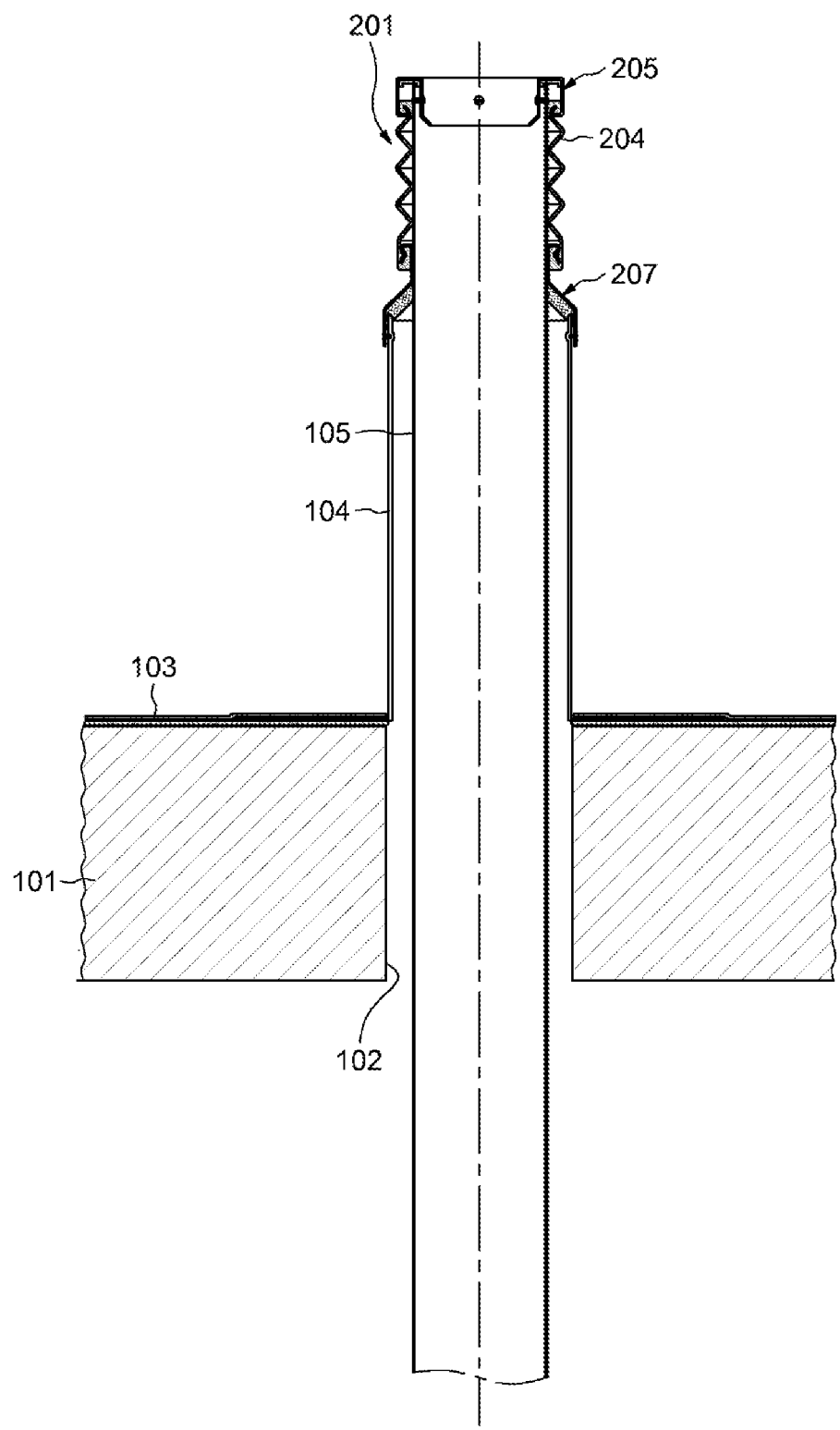
FIG. 4 represents in vertical section one example of application of the sealing device from FIG. 3.

In FIG. 4 there is shown an application of the sealing device 201 from FIG. 3 equivalent to that from FIG. 2.

This time, the upper end of the interior duct 105, which passes through the hole 102 in the wall 101, is situated above and beyond the upper end of the exterior duct 104 connected to the seal 103 of the wall 101.

The sealing device 201 is engaged around the end portion of the interior duct 105 and the coupling rings 205 and 207 are coupled to the ends of the interior and exterior ducts 205 and 204 respectively.

The invention claimed is:

1. A sealing device comprising:
an axially deformable tubular membrane having a first annular end and a second annular end,
a first annular coupling ring fastened to the first end of the tubular membrane and having a lateral annular flange providing an axial annular attachment space, and
a second coupling ring fastened to the second end of the tubular membrane and having a projecting lateral annular flange extending axially away from the first annular end of the tubular membrane and radially offset away from said axial annular attachment space relative to said lateral side of the tubular membrane;
wherein the first annular coupling annular ring comprises an interior annular flange, an external annular flange offset radially relative to the interior annular flange and connecting annular portion connecting the exterior annular flange and the interior annular flange,
wherein one of the interior and external annular flanges of the first annular coupling annular ring is fastened to the first end of the membrane and the other of the interior and external annular flanges delimits together with the membrane the axial annular attachment space, and
wherein the axial annular attachment space is axially open on the side of the second annular end of the tubular membrane.

2. The device as claimed in claim 1, in which:
the first coupling annular flange comprises an interior annular flange, an external annular flange offset radially relative to the interior annular flange and a connecting annular portion connecting the exterior annular flange and the interior annular flange;
the second coupling annular ring comprises an interior annular flange, an exterior annular flange offset radially outward relative to the interior annular flange and a connecting annular portion connecting the exterior annular flange and the interior annular flange;
the interior flange, respectively the exterior flange, of the first coupling annular ring being fastened to the first end of the membrane and the exterior flange constitutes said lateral annular flange of this first coupling annular ring;
the exterior flange, respectively the interior flange, of the second coupling annular ring being fastened to the second end of the tubular membrane and the interior flange constitutes said lateral annular flange of this second coupling annular ring.

3. The device as claimed in claim 2, in which the interior and exterior annular flanges and the connecting annular portion of the first coupling annular ring form a U shape.

4. The device as claimed in claim 2, in which the interior and exterior annular flanges of the second coupling annular ring extend axially away from each other and the connecting annular portion of this second coupling annular ring is of frustoconical shape.

5. The device as claimed in claim 1, in which the first coupling annular ring comprises a terminal annular flange engaged in a retaining annular slot of the first annular end of the tubular membrane.

6. The device as claimed in claim 5, in which said terminal annular flange of the first coupling annular ring forms a hook opposite the second annular end of the tubular membrane.

7. The device as claimed in claim 1, in which the first annular end of the tubular membrane comprises a bead in which said retaining annular slot is formed.

8. The device as claimed in any one of the preceding claims claim 1, in which the second coupling annular ring comprises a terminal annular flange engaged in a retaining annular slot of the second annular end of the tubular membrane.

9. The device as claimed in claim 8, in which said terminal annular flange of the second coupling annular ring forms a hook opposite the first annular end of the tubular membrane.

10. The device as claimed in claim 8, in which the second annular end of the tubular membrane comprises a bead in which said retaining annular slot is formed.

11. The device as claimed in claim 1, in which at least a part of the length of the tubular membrane takes the form of a bellows.

12. The device as claimed in claim 1, adapted to be coupled to coaxial ducts engaged one within the other, in which said attachment axial annular space of the first coupling annular ring is radially offset relative to the projecting lateral annular flange of the second coupling ring by at least the distance between the interior face of the interior duct and the exterior face of the exterior duct.

13. An assembly comprising two coaxial ducts engaged one in the other and having annular ends axially oriented on the same side and axially distant from each other so that one of the ducts projects relative to the other duct, and comprising a sealing device as claimed in claim 1, in which assembly the annular end of the projecting duct is engaged in said attachment annular space of said first coupling annular ring and the lateral annular flange of said second coupling annular ring cooperates with the annular end of the other duct.

14. The assembly as claimed in claim 13, comprising means for fixing said coupling annular rings to said ducts.

15. The assembly as claimed in claim 13, comprising an annular seal mounted on the first coupling annular ring and against which the end of the projecting duct bears in the axial direction and comprising an annular seal mounted on the second coupling annular ring and against which the end of the other duct bears in the axial direction.

* * * * *

UNITED STATES PATENT AND TRADEMARK OFFICE
CERTIFICATE OF CORRECTION

PATENT NO. : 11,480,269 B2
APPLICATION NO. : 16/496268
DATED : October 25, 2022
INVENTOR(S) : G. Iftissen It is certified that error appears in the above-identified patent and that said Letters Patent is hereby corrected as shown below:

In the Claims

| Column | Line | |
|---|---|---|
| 8 | 13-14 | change "in any one of the preceding claims claim" to -- in claim -- |

Signed and Sealed this
Twenty-second Day of August, 2023

Katherine Kelly Vidal
*Director of the United States Patent and Trademark Office*